(12) United States Patent
Graf et al.

(10) Patent No.: US 12,396,535 B2
(45) Date of Patent: Aug. 26, 2025

(54) PORTABLE, HEATABLE CONTAINER

(71) Applicant: Faitron AG, St. Gallen (CH)

(72) Inventors: Fabian Graf, Zürich (CH); Aron Kenessey, Meilen (CH)

(73) Assignee: Faitron AG, St. Gallen (CH)

( * ) Notice: Subject to any disclaimer, the term of this patent is extended or adjusted under 35 U.S.C. 154(b) by 610 days.

(21) Appl. No.: 16/474,094

(22) PCT Filed: Dec. 18, 2017

(86) PCT No.: PCT/IB2017/058035
§ 371 (c)(1),
(2) Date: Jun. 27, 2019

(87) PCT Pub. No.: WO2018/122669
PCT Pub. Date: Jul. 5, 2018

(65) Prior Publication Data
US 2020/0121047 A1    Apr. 23, 2020

(30) Foreign Application Priority Data
Dec. 28, 2016 (CH) .................... 01753/16

(51) Int. Cl.
*A45C 11/20* (2006.01)
*A61J 9/00* (2006.01)

(52) U.S. Cl.
CPC ............ *A45C 11/20* (2013.01); *A61J 9/008* (2013.01)

(58) Field of Classification Search
CPC ... A45C 11/20; A61J 9/008; A61J 9/02; A61J 2200/42; H05B 6/105; H05B 6/108; H05B 6/12; H05B 1/0244; A47G 19/2288; A47J 41/0044; A47J 36/2461; A47J 36/2472

USPC ............... 206/11.1–11.6, 541; 219/621
See application file for complete search history.

(56) References Cited

U.S. PATENT DOCUMENTS

| 2,551,728 | A | * | 5/1951 | Cybulski | .................. B23G 7/00 74/567 |
| 3,745,290 | A | * | 7/1973 | Harnden, Jr. | ........... A47J 39/00 220/574 |
| 3,762,542 | A | * | 10/1973 | Grimes | .................. A61J 9/008 206/525 |

(Continued)

FOREIGN PATENT DOCUMENTS

| CA | 2874482 A1 | * | 6/2016 | ............. A23L 33/40 |
| CN | 106073385 A | * | 11/2016 | ......... A47G 19/2288 |

(Continued)

OTHER PUBLICATIONS

International Search Report for PCT/IB2017/058035 filed dated Feb. 23, 2018.
Office Action dated Sep. 24, 2024 for EP17 829 297.5.

*Primary Examiner* — Chun Hoi Cheung
(74) *Attorney, Agent, or Firm* — Pleit Intellectual Property Law; Paul D. Bianco; Stephen Bongini

(57) ABSTRACT

A container for storing, transporting, and heating foods and drinks, in particular foods and drinks prepared for consumption by small children and babies. It is intended to be able to be used simply and safely by small children. The container includes a cylindrical outer casing with a closed base, the upper covering surface of which can be closed with a lid. A heatable inner cylinder with a base is arranged in the outer casing.

13 Claims, 4 Drawing Sheets

(56) References Cited

U.S. PATENT DOCUMENTS

| | | | | |
|---|---|---|---|---|
| 3,869,968 | A * | 3/1975 | Ihlenfeld | A47J 31/0573 99/280 |
| 4,170,931 | A * | 10/1979 | Fajans | A47J 31/053 392/467 |
| 4,354,082 | A * | 10/1982 | Tellert | H05B 6/12 219/625 |
| 4,356,382 | A * | 10/1982 | Keramati | A47J 31/0573 417/208 |
| 4,667,085 | A * | 5/1987 | Remmel | A47J 27/002 219/439 |
| 4,920,868 | A * | 5/1990 | Gehrmann | A47J 31/0573 99/279 |
| 4,930,902 | A * | 6/1990 | Yata | G01K 1/14 374/150 |
| 4,969,392 | A * | 11/1990 | Steele | A47J 31/56 99/305 |
| 5,168,793 | A * | 12/1992 | Padamsee | A47J 41/005 220/592.21 |
| 5,699,719 | A * | 12/1997 | Lucas | A47J 41/0016 99/305 |
| 5,844,212 | A * | 12/1998 | Dickens | B29C 66/81871 219/637 |
| 5,890,629 | A * | 4/1999 | Loew | B67D 3/0035 222/144.5 |
| 6,065,609 | A * | 5/2000 | Lake | A47J 31/02 206/217 |
| 6,072,161 | A * | 6/2000 | Stein | A47J 36/2472 219/386 |
| 6,082,591 | A * | 7/2000 | Healey | B65D 1/023 222/572 |
| 6,286,415 | B1 * | 9/2001 | Leung | A47J 31/441 99/290 |
| 6,310,329 | B1 * | 10/2001 | Carter | A47J 36/2461 219/442 |
| 6,793,075 | B1 * | 9/2004 | Jeter | A47G 19/2272 215/11.4 |
| 6,809,302 | B1 * | 10/2004 | Jones | A47J 36/2438 219/521 |
| 6,852,954 | B1 * | 2/2005 | Liu | A47J 36/2472 219/387 |
| D538,111 | S * | 3/2007 | Liu | D7/608 |
| 7,431,613 | B1 * | 10/2008 | Liu | A47J 36/2472 439/248 |
| D589,751 | S * | 4/2009 | Liu | D7/510 |
| 7,942,145 | B2 * | 5/2011 | Palena | F24V 30/00 126/263.01 |
| 8,020,507 | B2 * | 9/2011 | Strong | A61J 9/085 215/11.1 |
| 8,334,780 | B1 * | 12/2012 | Mendoza, Jr. | A47J 41/0094 340/584 |
| 8,796,598 | B2 * | 8/2014 | England | A47J 27/002 219/623 |
| 9,485,811 | B1 * | 11/2016 | Sansom | H05B 3/685 |
| 9,636,281 | B2 * | 5/2017 | Makrinos | A61J 9/0623 |
| 9,801,482 | B1 * | 10/2017 | Alexander | H05B 1/0244 |
| 9,995,529 | B1 * | 6/2018 | Banks | F25B 21/02 |
| 10,051,994 | B2 * | 8/2018 | Dunn | A47J 36/2438 |
| 11,576,509 | B2 * | 2/2023 | Baarman | A47J 36/2461 |
| 2002/0035929 | A1 * | 3/2002 | Kanba | A47J 31/0605 99/279 |
| 2004/0025702 | A1 * | 2/2004 | Cutter | A47J 27/21 99/279 |
| 2004/0065635 | A1 * | 4/2004 | Turnbough | A61J 9/00 215/396 |
| 2004/0140304 | A1 * | 7/2004 | Leyendecker | A47J 36/2433 219/521 |
| 2005/0045624 | A1 * | 3/2005 | Groll | A47J 27/10 219/621 |
| 2006/0120218 | A1 * | 6/2006 | Lansing | A61J 7/0409 368/10 |
| 2006/0162341 | A1 * | 7/2006 | Milazzo | F25D 31/005 62/3.6 |
| 2006/0266224 | A1 * | 11/2006 | Hammad | A47J 31/545 99/279 |
| 2007/0039477 | A1 * | 2/2007 | Bowden | A47J 31/005 99/279 |
| 2008/0041859 | A1 * | 2/2008 | Teglbjarg | A47J 36/2461 220/592.16 |
| 2008/0083692 | A1 * | 4/2008 | Strickler | A61J 11/045 215/11.6 |
| 2008/0142529 | A1 * | 6/2008 | LaGuardia | G01K 11/165 220/592.2 |
| 2008/0179311 | A1 * | 7/2008 | Koro | A47J 36/2416 219/430 |
| 2008/0251063 | A1 * | 10/2008 | Palena | F24V 30/00 126/263.09 |
| 2009/0184081 | A1 * | 7/2009 | Wu | A61J 9/02 215/11.1 |
| 2009/0266240 | A1 * | 10/2009 | Elissen | A47J 36/165 99/323.3 |
| 2010/0116819 | A1 * | 5/2010 | Pan | H05B 6/12 219/621 |
| 2010/0119668 | A1 * | 5/2010 | Maupin | A23L 3/32 426/241 |
| 2011/0048241 | A1 * | 3/2011 | Smit | A47J 31/50 99/323 |
| 2011/0170917 | A1 * | 7/2011 | Yoshikawa | G03G 15/2025 399/329 |
| 2011/0222931 | A1 * | 9/2011 | Shinshi | G03G 15/2064 399/329 |
| 2012/0085724 | A1 * | 4/2012 | Barker | A61J 9/02 215/11.2 |
| 2013/0105468 | A1 * | 5/2013 | Reischmann | A47J 36/02 219/622 |
| 2013/0126551 | A1 * | 5/2013 | Unger | B65D 1/0223 220/660 |
| 2013/0247591 | A1 * | 9/2013 | DeMasi | F25D 5/02 62/4 |
| 2013/0323371 | A1 * | 12/2013 | Kutcher | A23L 2/38 99/323.3 |
| 2014/0001142 | A1 * | 1/2014 | Wu | A61J 9/02 215/11.2 |
| 2014/0048440 | A1 * | 2/2014 | Prickett, Jr. | B65D 25/205 206/459.5 |
| 2014/0061210 | A1 * | 3/2014 | O'Hanley | A47J 41/0077 220/592.25 |
| 2014/0072287 | A1 * | 3/2014 | Zakowski | A47J 36/2433 392/394 |
| 2015/0122765 | A1 * | 5/2015 | Cannon | A61J 9/085 215/11.2 |
| 2015/0182063 | A1 * | 7/2015 | Mills | A47J 31/40 99/283 |
| 2015/0245421 | A1 * | 8/2015 | Heczko | H05B 6/1245 99/323.3 |
| 2015/0245723 | A1 * | 9/2015 | Alexander | A47J 39/025 219/387 |
| 2015/0250683 | A1 * | 9/2015 | Cross | A61J 9/06 206/459.1 |
| 2015/0366759 | A1 * | 12/2015 | Perera | A61J 9/008 215/11.1 |
| 2015/0375900 | A1 * | 12/2015 | Larson | B65D 23/0828 206/459.5 |
| 2016/0068294 | A1 * | 3/2016 | Gorbold | C03C 8/08 215/12.1 |
| 2016/0242598 | A1 * | 8/2016 | Alexander | H05B 3/06 |
| 2016/0278568 | A1 * | 9/2016 | Richter | A47J 31/057 |
| 2017/0075312 | A1 * | 3/2017 | Hammond | A61J 9/00 |
| 2017/0087524 | A1 * | 3/2017 | Deshpande | B65D 51/2892 |
| 2017/0094721 | A1 * | 3/2017 | Moore | B65D 1/02 |
| 2017/0210516 | A1 * | 7/2017 | Tebbe | B65D 43/166 |
| 2017/0295992 | A1 * | 10/2017 | Mangold | A47J 31/467 |
| 2017/0318999 | A1 * | 11/2017 | Han | A47J 31/4478 |
| 2018/0243173 | A1 * | 8/2018 | Kessels | G01F 15/063 |
| 2019/0015299 | A1 * | 1/2019 | Pyka | A61J 9/06 |
| 2019/0096224 | A1 * | 3/2019 | Shoham | G08B 21/182 |
| 2019/0269578 | A1 * | 9/2019 | Goodin | A47J 36/2433 |

(56) References Cited

U.S. PATENT DOCUMENTS

2019/0298616 A1* 10/2019 Quintero ................ A61J 11/008
2020/0297149 A1* 9/2020 Park .................. A47J 27/21091
2020/0377285 A1* 12/2020 Beckham ........... B65D 81/3876

FOREIGN PATENT DOCUMENTS

| | | | | |
|---|---|---|---|---|
| CN | 207996308 | U | 10/2018 | |
| CN | 110638655 | A * | 1/2020 | |
| DE | 10 2007 036 361 | A1 | 2/2009 | |
| DE | 2020 130 10997 | U1 | 3/2014 | |
| DE | 102014111817 | A1 * | 2/2016 | ........ A47J 27/21008 |
| DE | 202019105723 | U1 * | 1/2021 | ............. A61J 9/008 |
| FR | 2551728 | A3 * | 9/1983 | ............. B65D 25/56 |
| JP | 05111437 | A * | 5/1993 | |
| WO | WO-0207575 | A1 * | 1/2002 | ........ A47J 27/21041 |
| WO | WO-2008038054 | A2 * | 4/2008 | .......... B65D 51/226 |
| WO | WO-2010087560 | A2 * | 8/2010 | ................ A61J 9/02 |
| WO | 2011/112284 | A1 | 9/2011 | |
| WO | WO-2013097977 | A1 * | 7/2013 | ............ A47J 31/057 |
| WO | 2015/177726 | A1 | 11/2015 | |
| WO | WO-2016160019 | A1 * | 10/2016 | |

* cited by examiner

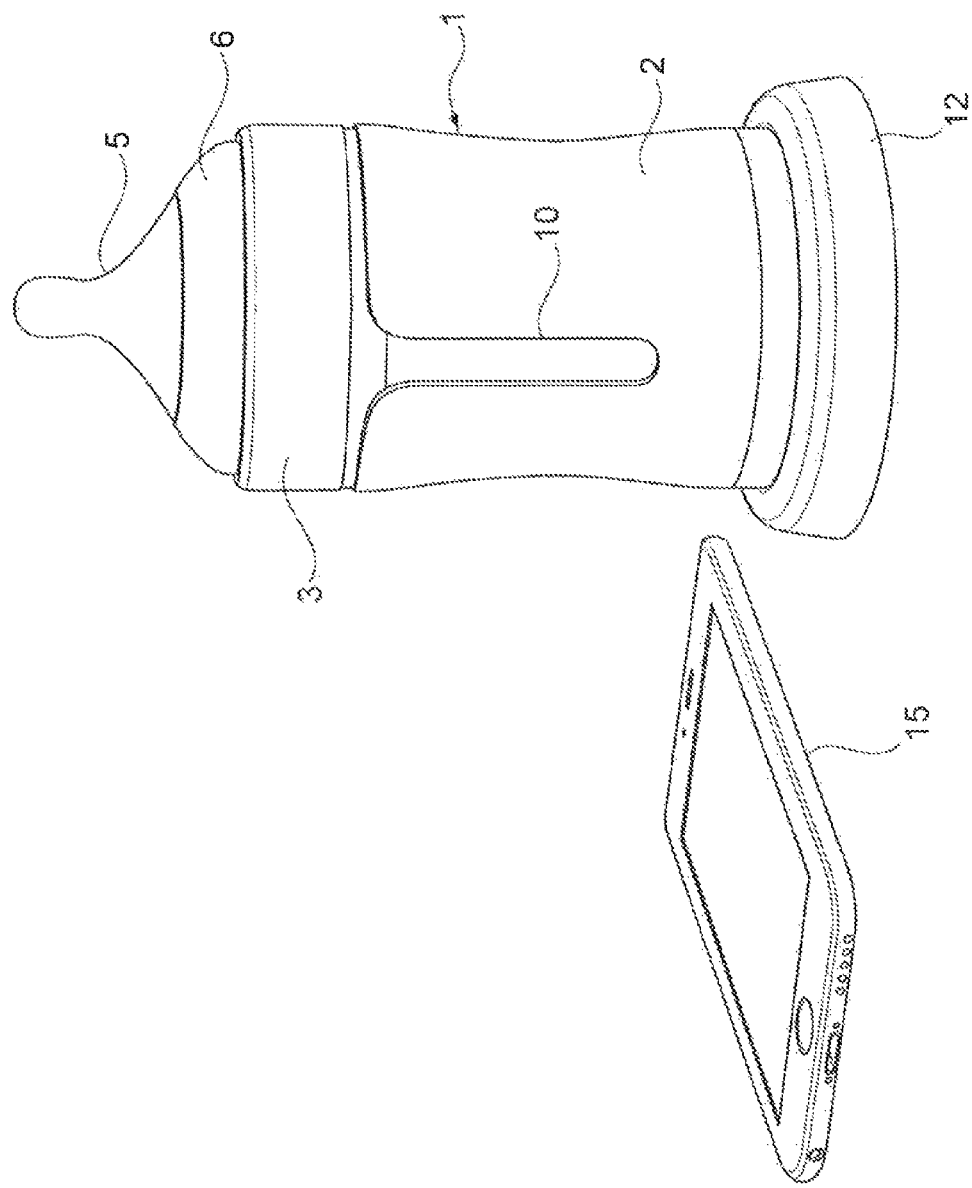

PORTABLE, HEATABLE CONTAINER

FIELD OF THE INVENTION

The invention relates to a lunch container for storing, transporting and for heating foods and drinks, in particular food and drinks prepared for consumption by small children and babies.

This is a lunch container which allows pre-prepared foods and drinks, for instance for on the go or for journeys to be transported and heated up within minutes in situ and thereby makes it possible to have a hot meal or hot drink, in particular milk, anywhere and at any time.

BACKGROUND

Known are heatable lunch boxes with a hinged lid or sides wherein closing of the lid or sides takes place by means of a zip fastener or Velcro strip.

A container for foodstuffs, in particular bread and toppings, according to WO 2011/112284 A1 has a flexible partition in order to produce an upper and a lower bowl. It serves exclusively to maintain an existing temperature of the food by means of an inserted heating or cooling gel.

From DE 202013010997 U1 a folding container is known which is designed in such a way that on folding out an upper bowl nothing can fall out. The folding container comprises an upper bowl and a lower bowl which are connected to each other in a hinged manner on one longitudinal side. On the opposite longitudinal side a snap-type connection is provided. The upper bowl is provided with an upper inner lid and the lower bowl with a lower inner lid so that both inner volumes can be closed off completely and independently of each other. On each side opposite the linkage of the inner lid a lid closure in the form of a snap-in projection is provided in the upper bowl and the lower bowl.

Disclosed in WO 2015/177726 A1 is a lunch box which is suitable for storing, transporting and heating foodstuffs, in particular ready-to-eat foods. It comprises an upper bowl and a lower bowl which are connected to each other in a hinged manner on one longitudinal side, wherein on the opposite longitudinal side a closure is provided. Arrangeable in the lower bowl is an inner bowl with a circumferential and angled edge area, to which is assigned thermal insulation and a heating element, wherein moulded into the circumferential edge of the inner bowl is a groove for receiving a seal.

The aforementioned prior art is not suitable for use by small children and also not for the storage, heating and keeping warm of drinks. Known, however, are normal baby bottles which can be inserted into a multisided heating container, comparable with a water bath with heating elements.

In addition there are normal coffee beakers for on the move, which heat up from the bottom, but which are only designed for hot drinks and for adults.

SUMMARY OF THE INVENTION

One aspect of the invention relates to a lunch container for small children and babies which is suitable for storing, transporting and for heating foods and drinks and which can be used simply and safely by small children.

In an embodiment, the lunch container, which in terms of its external appearance is designed in similar way to a drinks bottle. It comprises an essentially cylindrical and thermally insulating outer casing with a closed base, the upper covering surface of which can be closed with a lid. Arranged in the outer casing is a, preferably wirelessly, for example inductively heatable inner cylinder with a base. In particular, paste-like foods and drinks such as milk or tea can be heated.

In order to heat the foods or drinks, particularly the base and also the wall of the inner cylinder can be heated. Inversely cooling is also possible. Thanks to the insulation of the outer casing used this can scarcely become warmer than hand temperature. When using the lunch container the sustaining of injuries, in particularly burns, by the user, an adult as well as a baby or small child can thus be ruled out.

Energy for the inner cylinder is preferably supplied wirelessly and/or inductively so that the outer casing may not have to have any connections or switches. When on the go the use of a power pack or something similar is also possible. A charger can be based on the usual mains system of 230V AC or also 5/20V or 12/24V DC so that connection to a computer by way of a USB interface or to a cigarette lighter of a car is possible.

In the previously known containers or coffee beakers on the other hand, paste-like foods for children cannot be heated and cannot be consumed directly by small children.

Preferred embodiments of the invention are also disclosed.

For a visible indication of the filling level of the inner cylinder this can be provided with a, preferably transparent, slit with a corresponding shape on the outer casing, Alternatively an optical/electronic display is also possible.

For example, the lid can be provided with an inner thread for screw connection to an outer thread of the outer casing. To facilitate handling by children the lid is preferably provided with at least one moulded-on handle, wherein the handle can also be fastened on the lid. Particularly preferably two handles are provided. The handle is designed in such a way that small children of various ages can securely grasp it.

In a further preferred embodiment the lid is provided with an opening for receiving a teat. The teat can be adapted to the dispensing of fluids or pasty foods. The opening and teat can be protected against external influences by a mountable protective cap.

BRIEF DESCRIPTION OF THE DRAWINGS

The invention will be described in more detail below in examples of embodiment by means of the drawing and its function will be explained. In these.

FIG. 5: shows the lunch container according to the invention in a further form of embodiment.

DETAILED DESCRIPTION OF THE INVENTION

A lunch container 1 according to the invention is similar in dimensions to a short and broad drinks bottle or cup.

Figure 1:
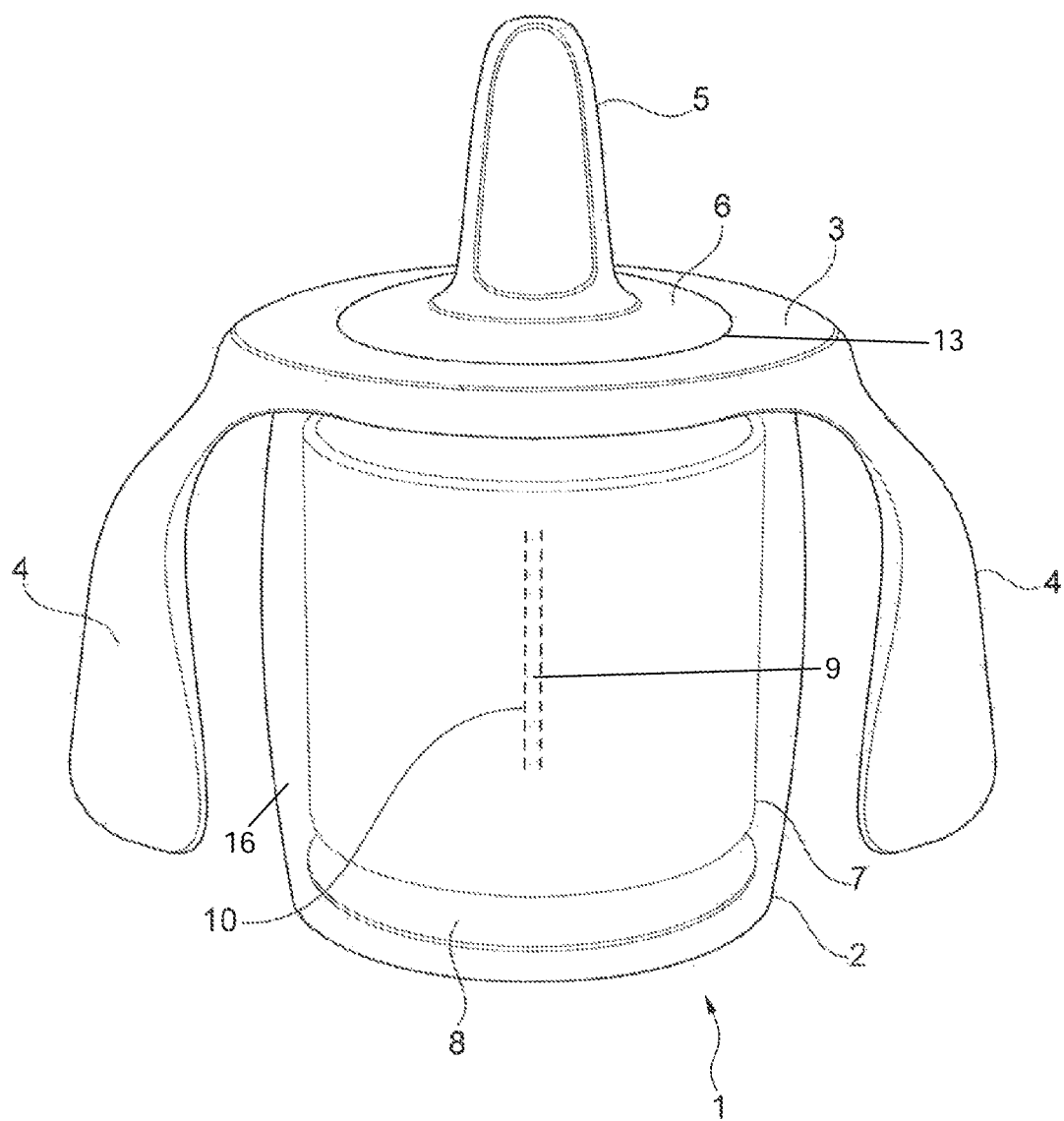
FIG. 1: shows a lunch container in accordance with the invention with a teat.

FIG. 1 shows an embodiment of a lunch container 1 according to the invention. It comprises an essentially cylindrical and thermally insulating outer casing 2 with a closed base, the upper cover surface of which is closed with a lid 3.

Arranged in the outer casing 2 is a preferably wirelessly, for example, inductively heatable inner cylinder 7 with a base 8. If this is not possible when used on the go, a USB connection or DC plug, not shown, to a power pack, which is not shown, can be produced.

Instead of being a heatable inner cylinder 7, the inner cylinder 7 can be surrounded by a mat-like heating element 16 which brings about heating of the inner cylinder 7.

The end surface of the inner cylinder 7 facing the lid 3 is open.

Thanks to the insulation of the outer casing 2 that is used, the latter can hardly become warmer than hand warmth. When the lunch container is being used it can therefore be ruled out that the user, an adult as well as a baby or small child will incur injuries, in particular burns.

For a visible indication of the filling level of the inner cylinder 7 it is provided with a slit 9 of transparent or translucent plastic with a corresponding shape in the outer casing 2. The filling level can thereby be inspected from outside.

Alternatively optical/electronic displaying of the filling level is possible.

Applied on the outer casing 2 is also a, for example, annular temperature indicator 11 which, for instance by means of LEDs illuminated in colour, shows certain temperatures of the drink or a food present in the container. For example a green LED in the case of an appropriate drinking/eating temperature or a red or blue LED in the case of too high or too low a temperature.

Figure 4:
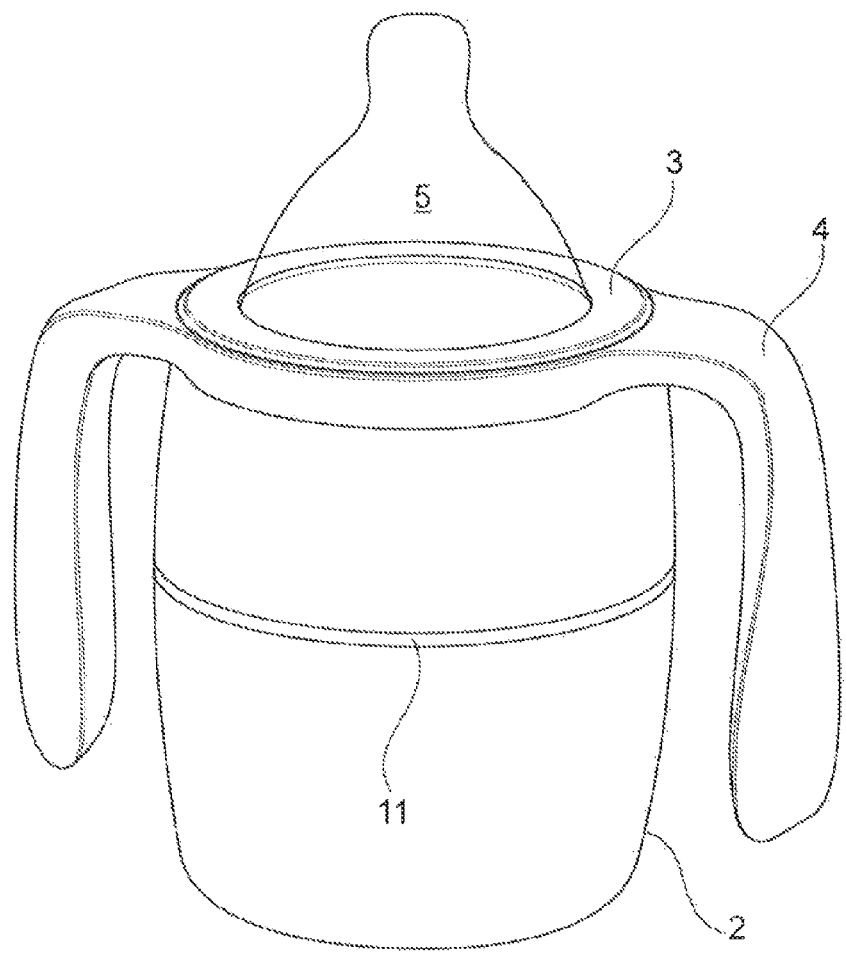
FIG. 4: shows the lunch container according to the invention in another form of embodiment.

As shown, the outer casing 2 can be designed in one part or also in two parts. In the two-part embodiment the outer casing 2 has a lower section and an upper section with an annular temperature indicator located between them (FIG. 4).

The lid 3 is provided with an inner thread for screwing onto an outer thread of the outer casing 2.

To facilitate handling by children the lid 3 in this form of embodiment is provided with two moulded-on handles 4 which are shaped in such a way that they can be securely grasped by small children or different ages.

The lid 3 is also provided with an opening 13 for receiving a base 6 of a teat 5 (known from drinks bottles). Preferred here are snap-on or click-on connections in the case of elastic plastic materials or pressing in of the base 6 into the opening in the case of deformable, rubber-like materials of the teat 5.

Figure 2:
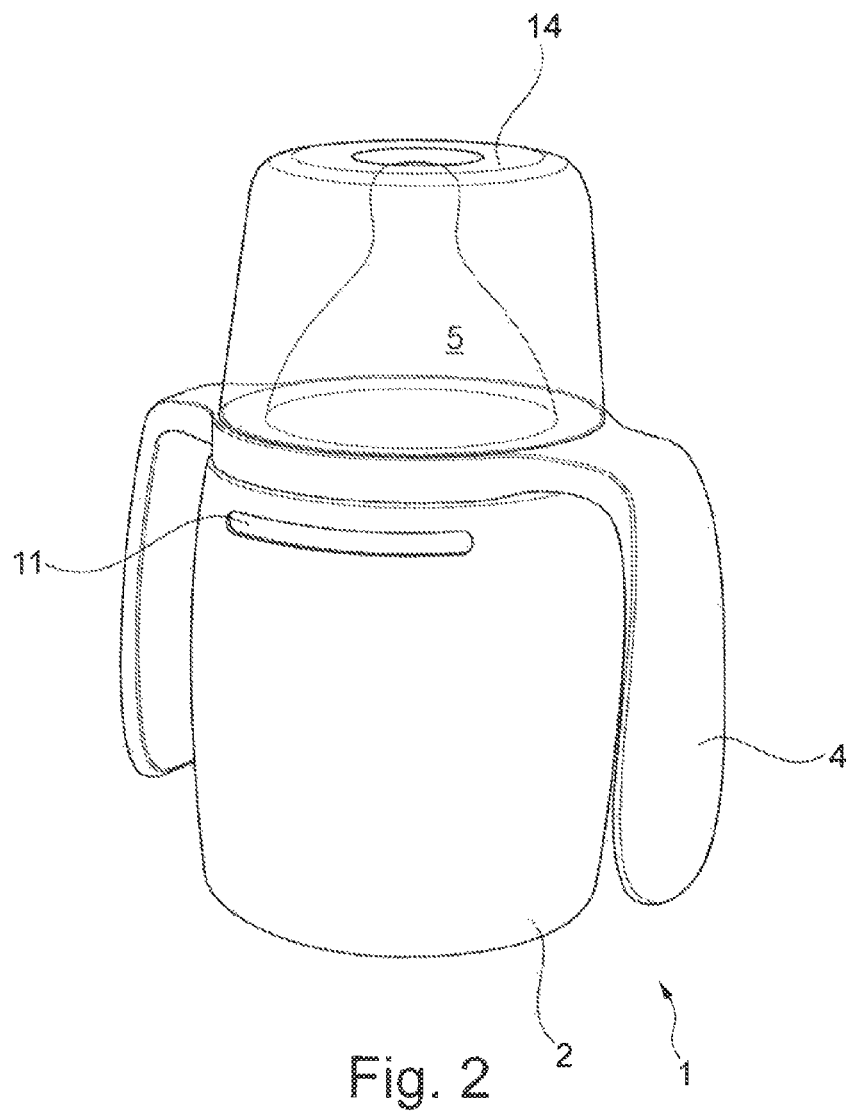
FIG. 2: shows a lunch container according to FIG. 1 with a protective cap

The opening 13 and teat 5 can be protected against outside influences by a protective cap 14 mountable on the lid 3 (FIG. 2).

Depending on the consistency of the paste-like food or the drinks, teats 5 of different, more particularly elastic materials and with a different teat opening are available.

Heatable in particular are paste-like foods and drinks, such as milk or tea.

Figure 3:
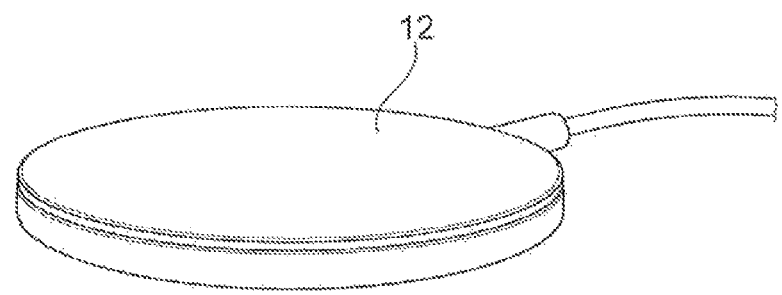
FIG. 3: shows a charger for the lunch container.

In the shown form of embodiment energy for the inner cylinder 7 and the base 8 is supplied wirelessly and inductively so that the outer casing 2 does not have to have any connections or switches. For this, the lunch container 1 according to the invention is placed with the base of the outer casing 2 onto the charging surface of a corresponding charging device 12. The charging device (FIG. 3) can be based on the conventional mains network of 110-230V AC, or on 5/20V or 12/24V DC so that connection to a computer by means of a USB interface or to a cigarette lighter of a car is possible.

FIG. 5 shows the lunch container 1 in a further form of embodiment with a heightened lid 3. The lid 3 can therefore be designed without a handle or can only have one handle 4.

Heating of the food or the drink can be controlled conventionally or by means of an app via a mobile phone 15 so that the user can precisely set and control a predetermined temperature. Various heating programs are also possible.

A possible electronic control system comprises the electronic circuit, a safety circuit, a power switch and also a power pack. The electronic circuit should comprise at least a temperature sensor, a heating switch, a start-stop switch and the output for the LEDs. The electronic circuit can also allow various heating modes.

In the known manner, the heating element of the inner cylinder 7 and the base 8 comprise, for example, a metallic heating foil or the inner cylinder 7 and the base 8 are themselves designed as a heating element.

LIST OF REFERENCE NUMBERS

1 Portable, heatable container
2 Outer casing
3 Lid
4 Handles
5 Teat
6 Base of teat
7 Inner cylinder
8 Base of inner cylinder
9 Slit
10 Filling level indicator
11 Temperature indicator
12 Charging station
13 Opening for receiving base of teat
14 Protective cap
15 Mobile phone
16 Heating element

The invention claimed is:

1. A container configured for storing, transporting, and heating foods and drinks, the container comprising:
a thermally insulating essentially cylindrical single walled outer casing comprising two separate parts consisting of a lower section and an upper section, the lower section and the upper section of the outer casing having an illuminated annular temperature indicator therebetween;
a heatable single walled inner cylinder arranged and contained within the outer casing; and
a lid configured for releaseably closing an upper surface of the upper section of the outer casing,
wherein an outer surface of the outer casing maintains a temperature that prevents injury to a user holding the container when the container is being heated and during use after heating, and
the container further comprises heating elements that can only heat the inner cylinder when the container is engaged with a charging station.

2. The container according to Claim 1, wherein the heatable inner cylinder includes a filling level indicator.

3. The container according to Claim 1, wherein the lid includes an inner thread for engaging with an outer thread of the outer casing.

4. The container according to Claim 1, wherein the lid includes at least one moulded-on handle.

5. The container according to Claim 1, wherein the lid includes an opening for receiving a base of a teat.

6. The container according to Claim 1, wherein the container is configured for engagement with a charging station, the inner cylinder being configured to be inductively heated when the container is engaged with the charging station, and the inner cylinder being configured to not be heatable when the container is not engaged with the charging station.

7. The container according to Claim 1, wherein the heatable inner cylinder includes a filling level indicator and the outer casing includes a transparent slit therethrough for viewing the filling level indicator.

8. The container according to Claim 1, wherein the container is configured for inductive heating of the inner cylinder that is controllable by an App of a mobile phone.

9. The container according to claim 1, wherein the heatable inner cylinder includes a base and a side wall that are themselves the heating elements of the container.

10. The container according to Claim 1, wherein no power storage elements are located between the outer casing and the inner cylinder or below the base of the inner cylinder.

11. The container according to Claim 1, wherein no control circuitry is located between the outer casing and the inner cylinder or below the base of the inner cylinder.

12. The container according to claim 1, wherein the container is configured to be inductively heated by the heating elements, and at least part of the inner cylinder itself comprises the heating elements for inductively heating the container.

13. The container according to Claim 12, wherein the base and the side wall of the inner cylinder are configured to be inductively heated.

\* \* \* \* \*